US009856687B2

(12) United States Patent
Shibata et al.

(10) Patent No.: US 9,856,687 B2
(45) Date of Patent: Jan. 2, 2018

(54) VEHICLE WINDOW OPENING DEVICE

(71) Applicant: ASMO CO., LTD., Shizuoka-ken (JP)

(72) Inventors: Kazuyuki Shibata, Kosai (JP); Masaru Kubota, Toyohashi (JP); Masaki Amakawa, Hamamatsu (JP)

(73) Assignee: ASMO CO., LTD., Shizuoka-ken (JP)

( * ) Notice: Subject to any disclaimer, the term of this patent is extended or adjusted under 35 U.S.C. 154(b) by 0 days.

(21) Appl. No.: 15/003,354

(22) Filed: Jan. 21, 2016

(65) Prior Publication Data

US 2016/0215553 A1 Jul. 28, 2016

(30) Foreign Application Priority Data

Jan. 23, 2015 (JP) ................................ 2015-011296
Feb. 6, 2015 (JP) ................................ 2015-022390
Feb. 10, 2015 (JP) ................................ 2015-024224

(51) Int. Cl.
*B60J 1/00* (2006.01)
*E05F 15/40* (2015.01)
*E05F 15/695* (2015.01)
*E05F 15/73* (2015.01)

(52) U.S. Cl.
CPC ............ *E05F 15/40* (2015.01); *E05F 15/695* (2015.01); *E05F 15/73* (2015.01); *E05Y 2900/55* (2013.01)

(58) Field of Classification Search
CPC ............................ E05F 15/40; E05Y 2900/55
USPC ....... 318/264–266, 272, 275, 277, 282, 286, 318/466–469, 626
See application file for complete search history.

(56) References Cited

U.S. PATENT DOCUMENTS 5,436,539 A * 7/1995 Wrenbeck ............ H02H 7/0851 318/265
6,972,536 B2 * 12/2005 Mukai .................... B60J 7/0573 318/286
7,067,996 B2 * 6/2006 Yamamoto ........... H02H 7/0851 318/280
7,908,061 B2 * 3/2011 Sakai .................... E05F 15/695 701/1

FOREIGN PATENT DOCUMENTS

JP 2010-144379 A 7/2010
JP 2011-122369 A 6/2011

* cited by examiner

*Primary Examiner* — Bentsu Ro
(74) *Attorney, Agent, or Firm* — Patterson Thuente Pedersen, P.A.

(57) ABSTRACT

A vehicle window opening device includes an open-close controller, a drawing determination unit, a restriction unit, and an initial mask zone setting unit. The drawing determination unit determines that a vehicle window has drawn in an object when a characteristic value of a motor is greater than or equal to a determination threshold value. The open-close controller executes anti-drawing control based on the drawing determination. The restriction unit restricts the open-close controller from executing the anti-drawing control when the vehicle window is located in the initial mask zone. The initial mask zone setting unit sets an initial mask zone to a normal value when a position where the vehicle window starts to open is located outside a fully closed region and to a fully closed region value that is greater than the normal value when the position where the vehicle window starts to open is located in the fully closed region.

5 Claims, 8 Drawing Sheets

VEHICLE WINDOW OPENING DEVICE

BACKGROUND

The present invention relates to a vehicle window opening device such as a power window device installed in a vehicle.

Japanese Laid-Open Patent Publication No. 2011-122369 discloses an example of a conventional vehicle window opening device (power window device) that includes an anti-drawing function, which limits situations in which an object is drawn into a door when opening a vehicle window. Such a vehicle window opening device detects an object that is drawn into a door by an opening vehicle window based on characteristic values (e.g., transition of changes in rotation speed) of the motor, which functions as a drive source. Based on the detection result, the vehicle window opening device, for example, deactivates the motor.

However, when the above vehicle window opening device starts operating, the characteristic values of the motor may be unstable because of a backlash in a drive system including the motor and the like. This may cause erroneous detection of a drawn-in object, that is, detection of a drawn-in object even though such a situation has not actually occurred. To solve this problem, a mask zone that invalidates the anti-drawing function may be set to a predetermined zone from where the window starts to open. In this case, the length set for the mask zone needs to be considered.

Additionally, when opening a fully closed vehicle window, the vehicle window opening device is affected by the friction produced with a weather strip arranged on an upper window frame in addition to the backlash in the drive system. Thus, when opening a fully closed vehicle window, a longer zone is needed between where the operation is started and where the characteristic values of the motor are stabilized than when opening the vehicle window that is not fully closed. Accordingly, a longer mask zone needs to be set to allow for application to a situation in which opening the fully closed vehicle window is opened. However, when the length of the mask zone is set in accordance with the fully closed state, the mask zone is longer than necessary when starting to operate the vehicle window from a non-fully closed state. This adversely affects the drawing detection function.

Japanese Laid-Open Patent Publication No. 2010-144379 describes another example of a conventional vehicle window opening device that performs speed control to obtain a low speed zone in which a vehicle window is operated at a low speed and a high speed zone in which the vehicle window is operated at a speed higher than the low speed.

The object detection function (entrapment detection function and drawing detection function) may be applied to a vehicle window opening device that performs speed control such as that described above. However, the change in the motor rotation speed would be small when an object interrupts the operation of the vehicle window in the low speed zone, in which the speed of the vehicle window is low. This may lengthen the time used to determine object detection.

Additionally, in a vehicle window opening device such as that described in Japanese Laid-Open Patent Publication No. 2011-122369, when closing the vehicle door during the opening of the vehicle window, an impact produced by the closed door increases changes in the characteristic values of the motor. This may cause an erroneous detection of a drawn-in object. An erroneous drawn-in object detection would result in an erroneous operation, that is, execution of the anti-drawing control (e.g., deactivation of motor) when an object has not been actually drawn.

SUMMARY

It is an object of the present invention to provide a vehicle window opening device that appropriately detects an entrapped object and a drawn-in object.

To achieve the above object, the first aspect of the invention is a vehicle window opening device that includes an open-close controller, a drawing determination unit, a restriction unit, and an initial mask zone setting unit. The open-close controller is configured to control opening and closing of a vehicle window that is driven by a motor. The initial mask zone setting unit is configured to set a predetermined zone from a position where the vehicle window starts to open as an initial mask zone. The drawing determination unit is configured to determine that the vehicle window has drawn in an object when a characteristic value of the motor is greater than or equal to a determination threshold value. The characteristic value of the motor changes in accordance with a change in a load applied to the vehicle window when the vehicle window opens. The open-close controller is configured to execute anti-drawing control that stops opening the vehicle window or reverses the vehicle window by a predetermined amount based on the drawing determination of the drawing determination unit. The restriction unit is configured to restrict the open-close controller from executing the anti-drawing control when the vehicle window is located in the initial mask zone even if the characteristic of the motor is greater than or equal to the determination threshold value. The initial mask zone setting unit is configured to set the initial mask zone to a normal value when the position where the vehicle window starts to open is located outside a fully closed region including a fully closed position. The initial mask zone setting unit is configured to set the initial mask zone to a fully closed region value that is greater than the normal value when the position where the vehicle window starts to open is located in the fully closed region.

To achieve the above object, the second aspect of the invention is a vehicle window opening device that includes an open-close controller, a drawing determination unit, and a determination threshold value setting unit. The open-close controller is configured to control opening and closing of a vehicle window that is driven by a motor. The drawing determination unit is configured to determine that the vehicle window has drawn in an object when a characteristic value of the motor is greater than or equal to a determination threshold value. The characteristic value of the motor changes in accordance with a change in a load applied to the vehicle window when the vehicle window opens. The open-close controller is configured to execute anti-drawing control that stops opening the vehicle window or reverses the vehicle window by a predetermined amount based on the drawing determination of the drawing determination unit. The determination threshold value setting unit is configured to set the determination threshold value to a normal value when a position where the vehicle window starts to open is located outside a fully closed region including a fully closed position. The determination threshold value setting unit is configured to set the determination threshold value to a fully closed region value that is greater than the normal value when the position where the vehicle window starts to open is located in the fully closed region.

To achieve the above object, the third aspect of the invention is a vehicle window opening device that includes an open-close controller, a change detection unit, and an object detection unit. The open-close controller is configured to control opening and closing of a vehicle window.

The change detection unit is configured to detect a change in an operation state of the vehicle window. The object detection unit is configured to compare a determination threshold value with a characteristic value corresponding to the change in the operation state of the vehicle window, which is detected by the change detection unit. The object detection unit is configured to determine that an object has interrupted operation of the vehicle window when the characteristic value is greater than or equal to the determination threshold value. The open-close controller is configured to control an operation speed of the vehicle window to obtain a low speed zone, in which the vehicle window is operated at a low speed, and a high speed zone, in which the vehicle window is operated at a high speed that is higher than the low speed. The object detection unit is configured to set the determination threshold value for the high speed zone to a first value. The object detection unit is configured to set the determination threshold value for the low speed zone to a second value that is smaller than the first value.

To achieve the above object, the fourth aspect of the invention is a vehicle window opening device that includes an open-close controller and a drawing determination unit. The open-close controller is configured to control opening and closing of a vehicle window that is driven by a motor. The drawing determination unit is configured to determine that the vehicle window has drawn in an object when a characteristic value of the motor is greater than or equal to a determination threshold value. The characteristic value of the motor changes in accordance with a change in a load applied to the vehicle window when the vehicle window opens. The open-close controller is configured to execute anti-drawing control based on the drawing determination of the drawing determination unit. The anti-drawing control stops opening the vehicle window or reverses the vehicle window by a predetermined amount. The drawing determination unit is configured to set the determination threshold value in accordance with an open-close state of a vehicle door.

To achieve the above object, the fifth aspect of the invention is a vehicle window opening device that includes an open-close controller, a drawing determination unit, and a restriction unit. The open-close controller controls opening and closing of a vehicle window that is driven by a motor. The drawing determination unit is configured to determine that the vehicle window has drawn in an object when a characteristic value of the motor is greater than or equal to a determination threshold value. The characteristic value of the motor changes in accordance with a change in a load applied to the vehicle window when the vehicle window opens. The open-close controller is configured to execute anti-drawing control based on the drawing determination of the drawing determination unit. The anti-drawing control stops opening the vehicle window or reverses the vehicle window by a predetermined amount. The restriction unit is configured to restrict the open-close controller from executing the anti-drawing control when a vehicle door is open even if the characteristic value of the motor is greater than or equal to the determination threshold value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of a power window opening device will now be described.

Figure 1:
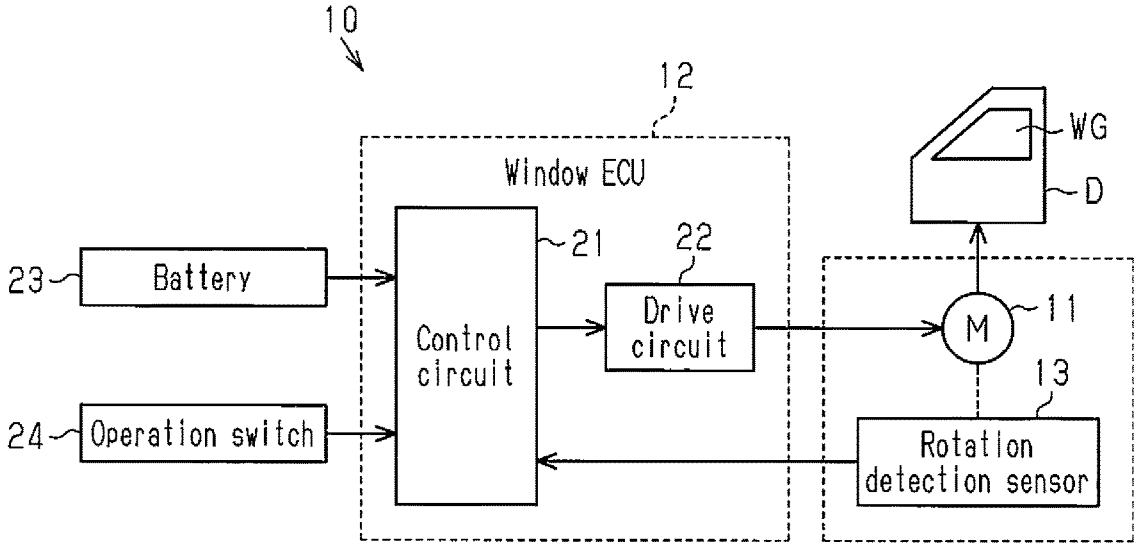
FIG. 1 is a schematic block diagram showing the electrical configuration of a first embodiment of a power window device according to the invention.

As shown in FIG. 1, a power window device 10 (vehicle window opening device) of the present embodiment is installed in a vehicle door D to open and close a window glass WG (vehicle window). The power window device 10 includes a motor 11 and a window regulator (not shown) that opens and closes the window glass WG when driven by the motor 11. The window regulator may be of an X-arm type. The motor 11 includes a DC motor and a geared motor including a reduction gear, which is integrally coupled to the DC motor. The window regulator converts rotation generated by the motor 11 into the opening and closing the window glass WG.

The power window device 10 includes a window ECU 12, which controls the operation of the window glass WG by controlling the motor 11, and a rotation detection sensor 13, which detects the rotation of the motor 11. The rotation detection sensor 13 includes, for example, a hall IC. The rotation detection sensor 13 detects changes in the magnetic field when a sensor magnet (not shown) arranged on a rotation shaft of the motor 11 rotates to detect rotation information such as the rotation speed and the rotation position of the motor 11.

The window ECU 12 is arranged separately from the motor 11 or integrated in the motor 11. The window ECU 12 includes a control circuit 21 and a drive circuit 22. The drive circuit 22 supplies power from an in-vehicle battery 23 to the motor 11 based on control of the control circuit 21. In the first embodiment, the control circuit 21 functions as an open-close controller, a drawing determination unit, a restriction unit, and an initial mask zone setting unit.

The control circuit 21 drives the motor 11 through the drive circuit 22 to control the opening and closing of the window glass WG based on operation of an operation switch 24 arranged on the vehicle door D. The control circuit 21 also calculates position information of the window glass WG based on a rotation detection signal (pulse signal) output from the rotation detection sensor 13. In the present embodiment, the control circuit 21 calculates the count of pulse edges (rising edges and falling edges) of the rotation detection signal from a fully closed position Pc of the window glass WG, which is the reference (zero). The count, which serves as the position information of the window glass WG, is increased or decreased when opening or closing the window glass WG (i.e., forward or inverse rotation of motor 11). The control circuit 21 also detects the rotation direction of the motor 11 based on the rotation detection signal. Additionally, the control circuit 21 calculates the rotation speed of the motor 11 and an amount of change in the speed of the motor 11 (speed change amount co) from intervals (cycles) of the pulses of the rotation detection signal.

The control circuit 21 functions to prevent entrapment between the window glass WG and a frame of the vehicle door D. The anti-entrapping function detects an entrapped object caused by the window glass WG when closing (rising) based on the transition of changes in the rotation speed of the motor 11 calculated from the rotation detection signal or the like. When detecting the entrapped object, the anti-entrapping function reverses the operation of the window glass WG in the opening direction to release the entrapped object.

The control circuit 21 also functions to prevent an object from being drawn in the vehicle door D when opening (lowering) the window glass WG. More specifically, when opening the window glass WG, the control circuit 21 compares the speed change amount ω of the motor 11, which is calculated based on the rotation detection signal, and a drawing determination threshold value ωt. When the speed change amount ω is greater than or equal to the drawing determination threshold value ωt, the control circuit 21 determines that the window glass WG has drawn in an object. The control circuit 21 deactivates the motor 11 to stop the window glass WG from opening based on the drawing determination.

Figure 2:
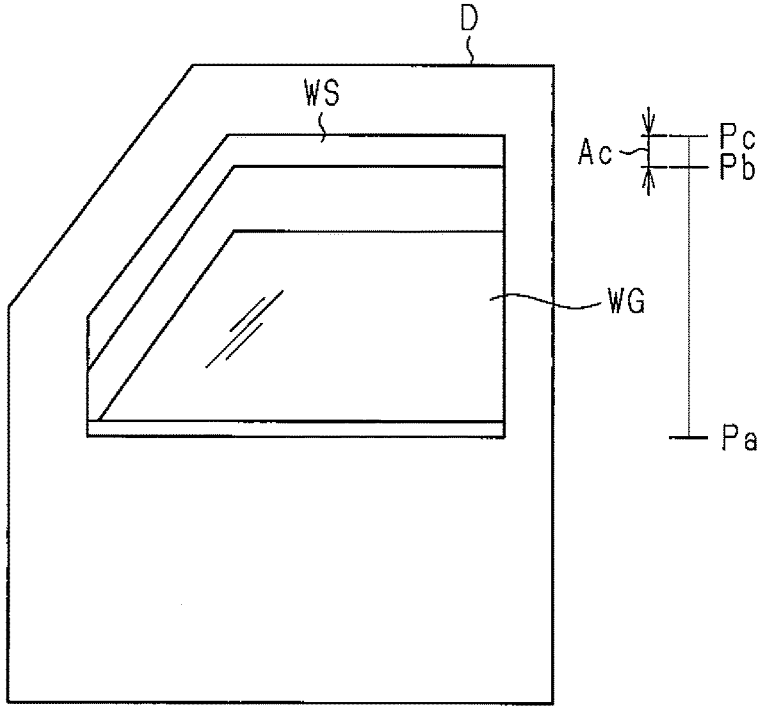
FIG. 2 is a schematic diagram showing the opening and closing of a window glass shown in FIG. 1.

As shown in FIG. 2, the control circuit 21 recognizes the fully closed position Pc, a boundary position Pb, which is proximate to the fully closed position Pc, and a fully open position Pa of the window glass WG. As described above, the fully closed position Pc is set to a pulse edge count of zero. The window glass WG includes an upper end, which can be inserted by a predetermined depth in a weather strip WS arranged on the upper window frame of the vehicle door D. When inserted, a glass surface of the upper end of the window glass WG is elastically pressed by the weather strip WS. The boundary position Pb is set to where the window glass WG starts to contact the weather strip WS when closing (lifting). More specifically, the boundary position Pb is set to the count (e.g., 30) corresponding to a depth (approximately 5 to 6 mm) of the upper end of the window glass WG inserted in the weather strip WS.

The control circuit 21 invalidates the anti-drawing function in a predetermined zone (initial mask zone M) from a position where the window glass WG starts to open. When receiving an operation signal corresponding to the operation of the operation switch 24, the control circuit 21 sets the initial mask zone M in accordance with the current position of the window glass WG. More specifically, when the operation signal is received and the upper end of the window glass WG is located toward the fully open position Pa from the boundary position Pb (toward open side), the control circuit 21 sets the initial mask zone M to a normal value Ms. When starting the operation, the speed change amount ω of the motor 11 is unstable because of backlash in the drive system, including the motor 11 and the window regulator. The normal value Ms is set so that the anti-drawing function is invalidated in a zone where the speed change amount ω is unstable. The normal value Ms of the present embodiment is set to, for example, a pulse edge count of 40.

When the operation signal is received and the upper end of the window glass WG is located in a zone (fully closed region Ac) between the fully closed position Pc and the boundary position Pb, the control circuit 21 sets the initial mask zone M to a fully closed region value Mc that is greater than the normal value Ms. The fully closed region value Mc is obtained by adding a predetermined correction value Ma (fixed value) to the normal value Ms. The correction value Ma of the present embodiment is set to, for example, a pulse edge count of 10. The fully closed region value Mc is set to 50, which is obtained by adding the correction value Ma (10) to the normal value Ms (40).

The control executed in the first embodiment when starting the opening operation and the effect will now be described.

Figure 3:
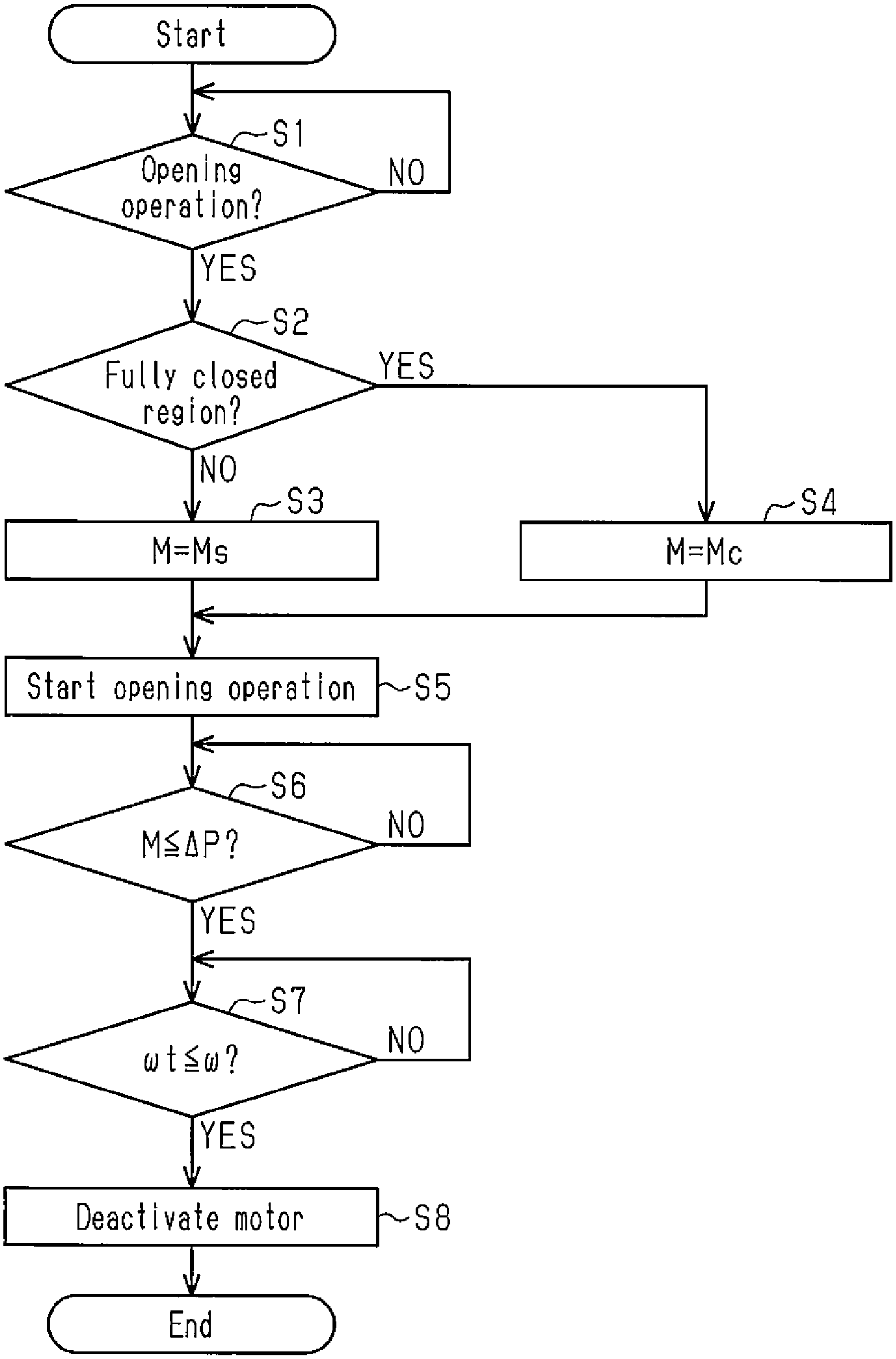
FIG. 3 is a flowchart showing the control of the power window device shown in FIG. 1.

As shown in FIG. 3, based on the opening operation of the operation switch 24 in step S1, the control circuit 21 determines whether or not the window glass WG is located in the fully closed region Ac, that is, whether or not the window glass WG is located between the boundary position Pb and the fully open position Pa (step S2). When determining that the window glass WG is located outside the fully closed region Ac (i.e., located between boundary position Pb and fully open position Pa), the control circuit 21 sets the normal value Ms to the initial mask zone M (step S3). When determining that the window glass WG is located in the fully closed region Ac (i.e., located on boundary position Pb or between boundary position Pb and fully closed position Pc), the control circuit 21 sets the fully closed region value Mc to the initial mask zone M (step S4).

After setting the initial mask zone M in step S3 or step S4, the control circuit 21 drives the motor 11 to start to open the window glass WG (step S5).

In step S6, the control circuit 21 compares a movement amount ΔP from the operation start position of the window glass WG with the initial mask zone M (normal value Ms or fully closed region value Mc), which is set in step S3 or step S4. When the movement amount ΔP is greater than or equal to the initial mask zone M, the drawing determination is performed in step S7.

When the movement amount ΔP is less than the initial mask zone M, step S6 is repeated. More specifically, until the window glass WG moves beyond the initial mask zone M from the operation start position, the drawing determination is not performed in step S7, that is, the anti-drawing function is invalidated. Consequently, even when the speed change amount ω of the motor 11 reaches or exceeds the drawing determination threshold value ωt because of backlash in the drive system, including the motor 11, the window regulator, and the like, the motor 11 is not deactivated while the window glass WG is located in the initial mask zone M.

In step S7, the control circuit 21 performs the drawn-in object determination when opening the window glass WG. The control circuit 21 compares the speed change amount ω of the motor 11 and the drawing determination threshold value ωt. When the speed change amount ω is greater than or equal to the drawing determination threshold value ωt, the control circuit 21 determines that the window glass WG has drawn in an object. The control circuit 21 deactivates the motor 11 to stop the window glass WG from opening based on the drawing determination (step S8). When the speed change amount ω is less than the drawing determination threshold value ωt, the control circuit 21 determines that the window glass WG has not drawn in an object and repeats step S7.

The first embodiment has the advantages described below.

(1) When the window glass WG is located in the initial mask zone M from the operation start position, the control circuit 21 performs a restriction so that the anti-drawing control (deactivation of the motor 11) is not executed even when the speed change amount ω of the motor 11 is greater than or equal to the drawing determination threshold value ωt. This prevents an erroneous detection, that is, detection of a drawn-in object when such a situation has not actually occurred due to the backlash in the drive system including the motor 11 and the window regulator. Consequently, the drawn-in object detection function is improved.

When the window glass WG starts to open in a position located outside the fully closed region Ac, the control circuit 21 sets the initial mask zone M to the normal value Ms. When the window glass WG starts to open in a position located in the fully closed region Ac, the control circuit 21 sets the initial mask zone M to the fully closed region value Mc, which is greater than the normal value Ms. When starting to open the window glass WG that is located in the fully closed region Ac, or in contact with the weather strip WS, the window glass WG is affected by the friction produced with the weather strip WS in addition to the backlash in the drive system. Thus, the zone from the operation start position to where the speed change amount ω of the motor 11 is stabilized needs to be long compared to when the operation is started from a position located outside the fully closed region Ac. In the present embodiment, when the open start position of the window glass WG is located in the fully closed region Ac, the initial mask zone M is set to the value Mc, which is greater than the normal value Ms. The value Mc is determined taking into consideration the effect of the weather strip WS. This prevents the erroneous detection of a drawn-in object when the window glass WG starts to open from the fully closed region Ac. When the open start position of the window glass WS is located outside the fully closed region Ac, the initial mask zone M is set to the normal value Ms, which is determined without taking into consideration the effect of the weather strip WS. Thus, the initial mask zone M is set to an appropriate value without being extended longer than necessary.

Accordingly, when the open start position of the window glass WG is located outside the fully closed region Ac, the initial mask zone M is set to the appropriate value, which is not longer than necessary. Additionally, when opening the window glass WG from the fully closed region Ac, the initial mask zone M is set to a length (fully closed region value Mc) that ensures prevention of the erroneous detection of a drawn-in object. This may improve the drawn-in object detection function.

(2) The fully closed region Ac is set in accordance with the depth of the window glass WG inserted in the weather strip WS arranged on the upper window frame. More specifically, when the window glass WG is located outside the fully closed region Ac, the window glass WG is not in contact with the weather strip WS. Thus, when the open start position is located outside the fully closed region Ac, the initial mask zone M may be set to the value (normal value Ms) that is determined without taking into consideration the effect of the weather strip WS. In this case, the erroneous detection of a drawn-in object may also be prevented in the initial mask zone M.

The first embodiment may be modified as follows.

Figure 4:
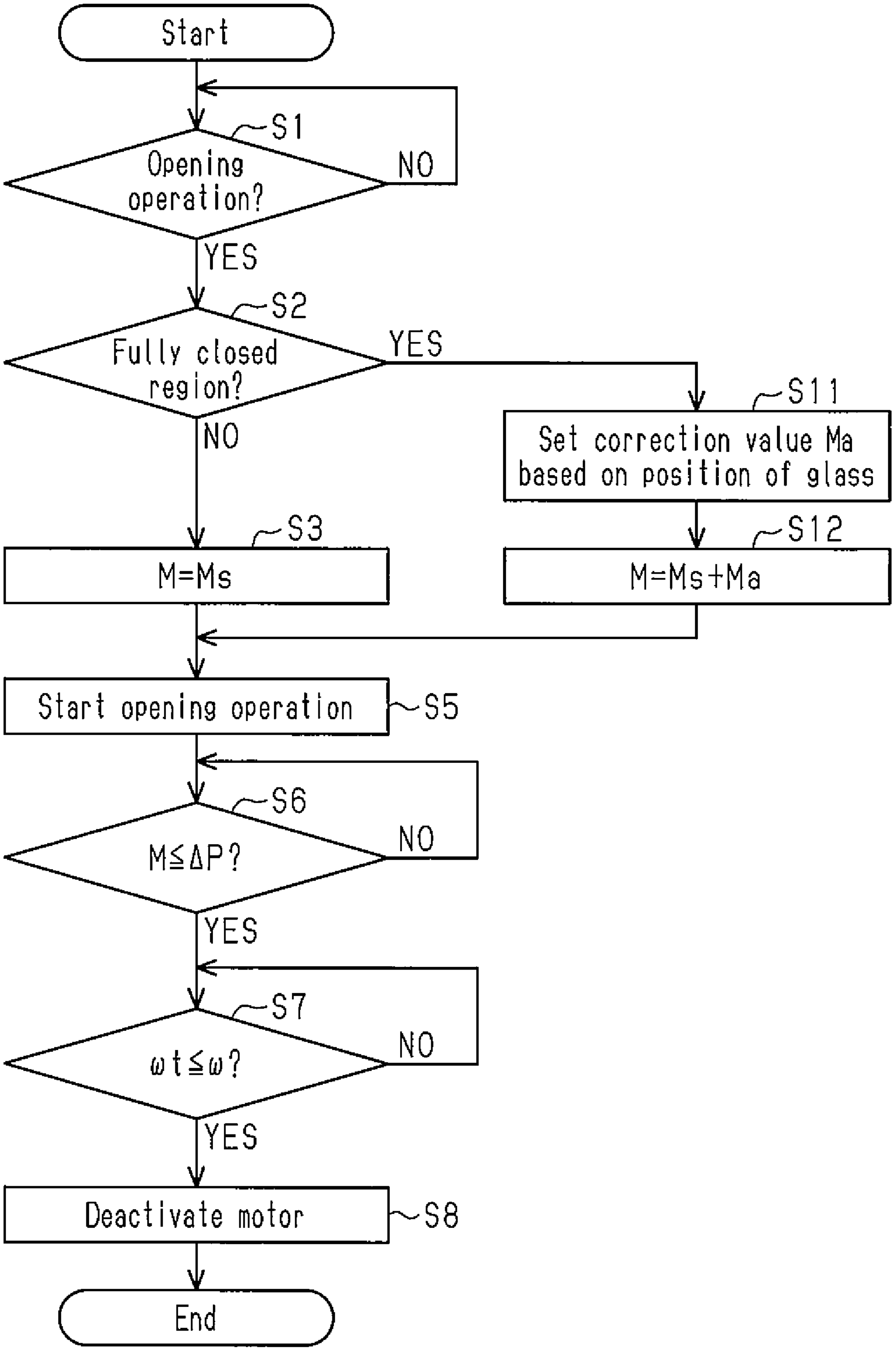
FIG. 4 is a flowchart showing the control of a modified example of the power window device of the first embodiment.

In the first embodiment, the fully closed region value Mc is obtained by adding the fixed correction value Ma to the normal value Ms. However, the correction value Ma does not necessarily have to be fixed. As shown in FIG. 4, the correction value Ma may be changed, for example, in accordance with the position of the window glass WG in the fully closed region Ac. As shown in FIG. 4, in step S2, when determining that the window glass WG is located in the fully closed region Ac, the control circuit 21 sets the correction value Ma to a value corresponding to the position of the window glass WG (step S11). More specifically, when the window glass WG is located on the fully closed position Pc, the control circuit 21 sets the correction value Mc to a maximum value (e.g., pulse edge count of 10). The control circuit 21 sets the correction value Mc to a smaller value decreased from the maximum value as the window glass WG is separated away from the fully closed position Pc toward the fully open position Pa. The control circuit 21 sets the initial mask zone M to a value that has been set in step S11 by adding the correction value Ma and the normal value Ms (step S12).

In this configuration, the initial mask zone M is set to be longer as the window glass WG becomes more proximate to the fully closed position Pc, that is, as the portion of the window glass WG contacting the weather strip SW becomes larger. Thus, the initial mask zone M is set to a further appropriate value.

Figure 5:
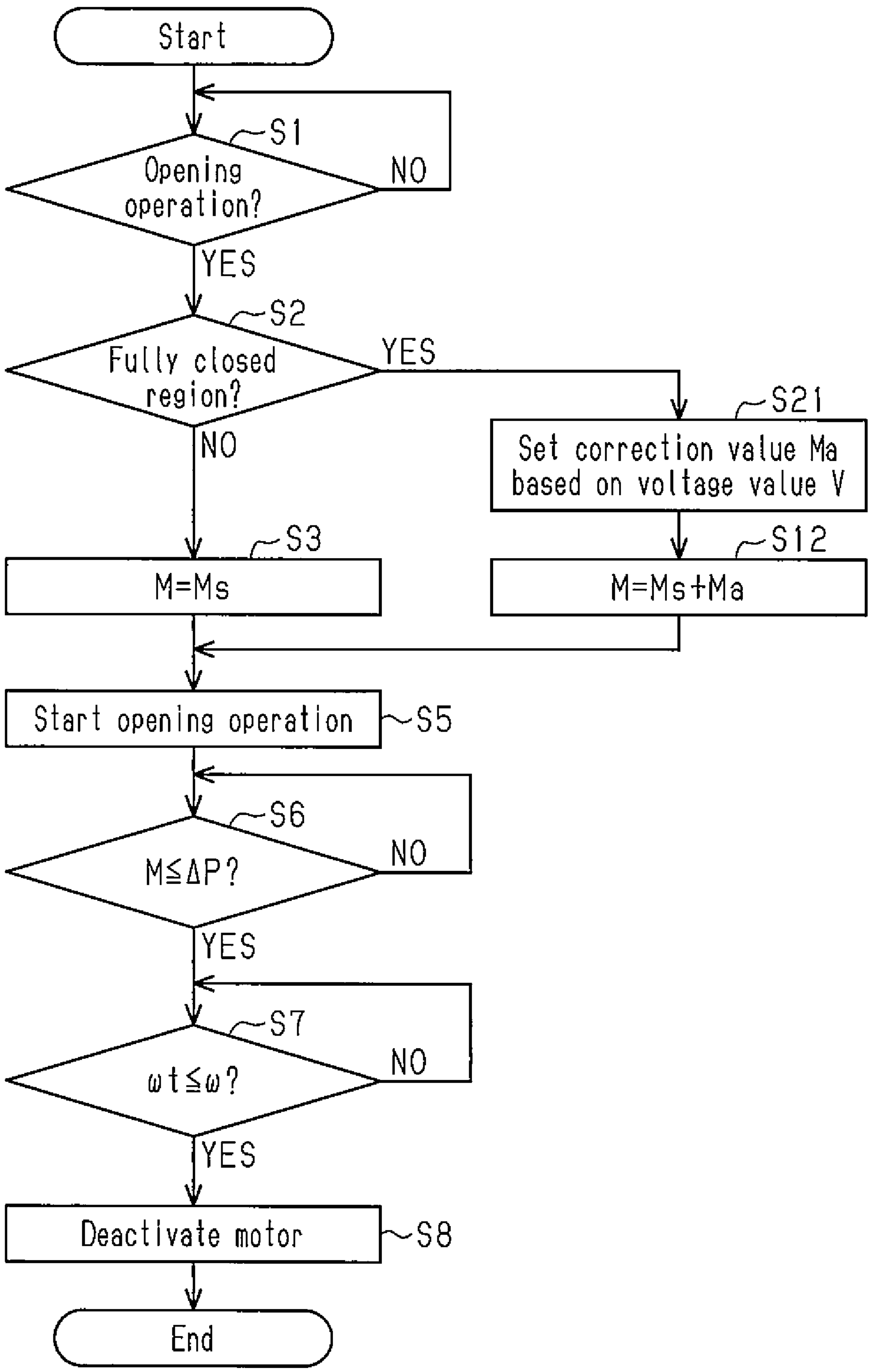
FIG. 5 is a flowchart showing the control of another modified example of the power window device of the first embodiment.

Alternatively, the correction value Ma may be set in accordance with a voltage value V applied to the motor 11 when the window glass WG was previously closed (and located in the fully closed region Ac). As shown in FIG. 5, in step S2, when determining that the window glass WG is located in the fully closed region Ac, the control circuit 21 sets the correction value Ma, for example, to a value corresponding to the voltage value V applied when the window glass WG was previously closed (step S21). More specifically, the control circuit 21 stores the applied voltage value V, for example, when closing the window glass WG and the window glass WG passes through the boundary position Pb in a memory (not shown). In step S21, the control circuit 21 refers to the memory to obtain the stored applied voltage value V. The control circuit 21 sets the correction value Ma to a greater value as the applied voltage value V increases.

In this configuration, the position of the window glass WG in the fully closed region Ac and the state of the backlash in the drive system, including the motor 11 and the window regulator, change depending on the applied voltage value V in the previous closing operation. Thus, the correction value Ma is set based on the applied voltage value V. This sets the initial mask zone M to a further appropriate value.

In the example shown in FIG. 5, subsequent to an opening operation of the operation switch 24 (step S1), the control circuit 21 sets the correction value Ma to a value corresponding to the applied voltage value V. Instead, for example, when stopping the window glass WG from closing, the initial mask zone M (correction value Ma) for the next opening operation may be set in advance based on the applied voltage value V.

Figure 6:
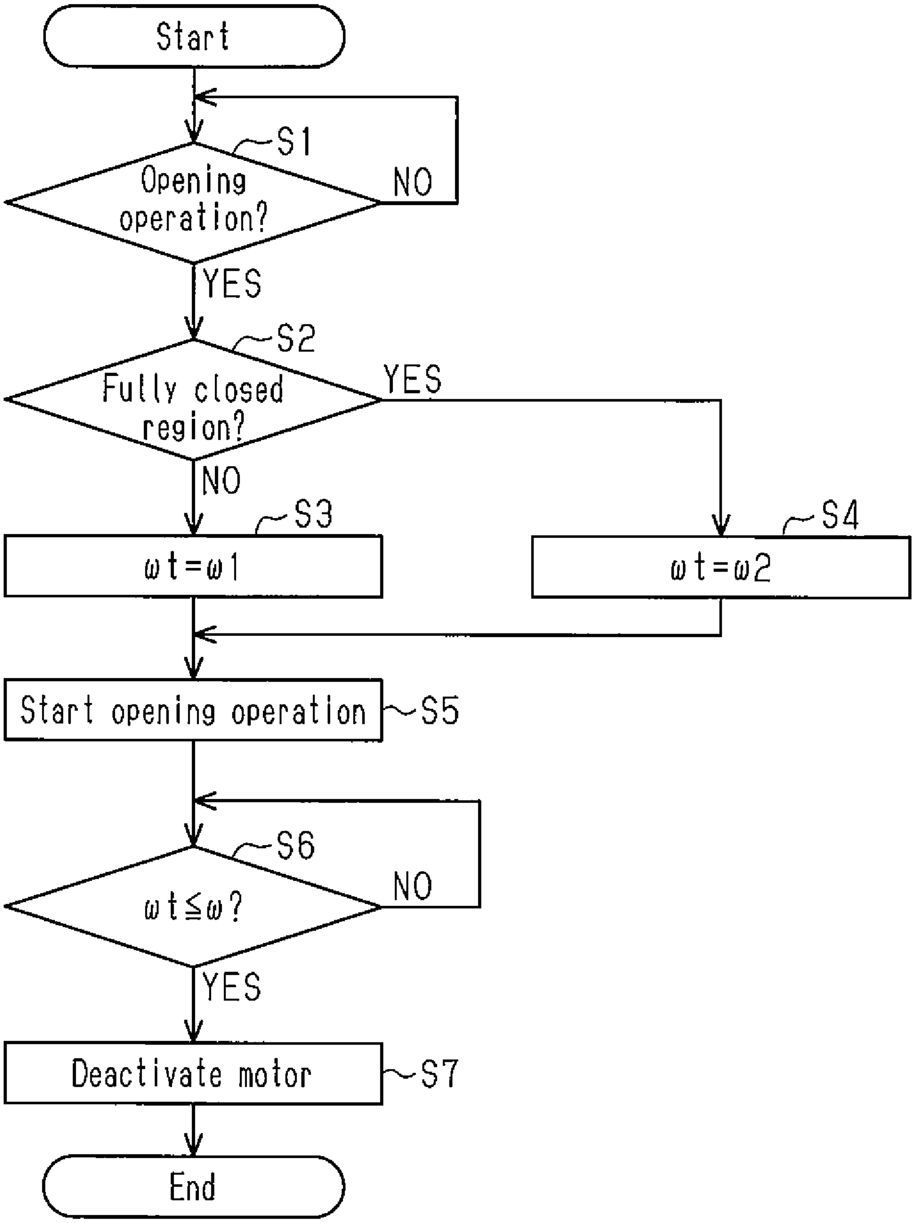
FIG. 6 is a flowchart showing the control of another modified example of the power window device of the first embodiment.

In the first embodiment, the initial mask zone M for when the open start position of the vehicle window is located in the fully closed region differs from that for the open start position of the vehicle window is located outside the fully closed region. This limits adverse effects on the drawn-in object detection function that may be caused by the weather strip. Instead, as shown in FIG. 6, the initial mask zone M may be omitted. When the mask zone is omitted, the effect of the weather strip may be reduced by lowering the sensitivity for the drawing determination when the open start position of the vehicle window is located in the fully closed region from that when the open start position of the vehicle window is located outside the fully closed region. In this modified example, the control circuit 21 functions as an open-close controller, a drawing determination unit, and a determination threshold value setting unit.

More specifically, as shown in FIG. 6, in step S2, when determining that the window glass WG is located outside the fully closed region Ac (located between boundary position Pb and fully open position Pa), the control circuit 21 sets the drawing determination threshold value ωt to a normal value ω1 (step S3). When determining that the window glass WG is located in the fully closed region Ac (located on boundary position Pb or between boundary position Pb and fully closed position Pc), the control circuit 21 sets the drawing determination threshold value ωt to a fully closed region value ω2 that is greater than the normal value ω1 (step S4).

In this configuration, when the open start position of the window glass WG is located in the fully closed region Ac, the drawing determination threshold value ωt is set to the fully closed region value ω2, which is determined taking into consideration the effects of the backlash in the drive system, including the motor 11 and the window regulator, and the friction produced with the weather strip. Thus, when the window glass WG is located in the fully closed region, the drawing is not determined until the speed change amount ω of the motor 11 reaches the fully closed region value ω2, which is greater than the normal value ω1. This reduces the effect of the weather strip during the drawing determination.

In the first embodiment, the control circuit 21 detects the drawn-in object based on the speed change amount ω of the motor 11. Instead, a drawn-in object may be detected based on characteristic values other than the speed change amount ω of the motor 11 (characteristic values of the motor 11 that vary in accordance with changes in load acting on the window glass WG).

In the first embodiment, the control circuit 21 deactivates the motor 11 to stop the window glass WG from opening based on the drawing determination. Additionally, for example, the window glass WG may be inversely operated by a predetermined amount in the closing direction based on the drawing determination.

In the first embodiment, the boundary position Pb, which defines the range of the fully closed region Ac, is set to a position where the window glass WG starts to contact the weather strip WS when closing. Instead, for example, the boundary position Pb may be set between the position where the window glass WG starts to contact the weather strip WS and the fully closed position Pc. That is, the fully closed region Ac may be set shorter than a length corresponding to the depth of the window glass WG inserted in the weather strip WS.

In the first embodiment, the invention is applied to the power window device 10, which includes the X-arm type window regulator. Instead, the invention may be applied to a power window device that includes a window regulator of a wire-type, a single-arm type, or the like.

In the first embodiment, the invention is applied to the power window device 10, which opens and closes the window glass WG included in the vehicle door D. Additionally, the invention may be applied to a sunroof device that opens and closes a roof glass included in a vehicle roof.

Technical concepts that can be acknowledged from the first embodiment and the modified examples of the first embodiment are as follows.

(A) A vehicle window opening device comprising:

an open-close controller configured to control opening and closing of a vehicle window that is driven by a motor;

a drawing determination unit;

a restriction unit; and an initial mask setting unit configured to set a predetermined zone from where the vehicle window starts to open as an initial mask zone, wherein the drawing determination unit is configured to determine that the vehicle window has drawn in an object when a characteristic value of the motor is greater than or equal to a determination threshold value, wherein the characteristic value of the motor changes in accordance with a change in a load applied to the vehicle window when the vehicle window opens, the open-close controller is configured to execute anti-drawing control that stops opening the vehicle window or reverses the vehicle window by a predetermined amount based on the drawing determination of the drawing determination unit, the restriction unit is configured to restrict the open-close controller from executing the anti-drawing control when the vehicle window is located in the initial mask zone even if the characteristic value of the motor is greater than or equal to the determination threshold value, and the initial mask zone setting unit is configured to set a length of the initial mask zone that is used the next time the vehicle window opens based on a value of voltage applied to the motor when closing the vehicle window.

In this configuration, the backlash in the drive system including the motor varies in size (i.e., length of free running zone when starting operation) in accordance with the value of voltage applied to the motor when closing the vehicle window. Thus, the length of the initial mask zone is set in accordance with the applied voltage value. This sets the initial mask zone to a further appropriate value.

A second embodiment of a vehicle window opening device will now be described. The second embodiment of the power window device 10 has the same configuration as the power window device 10 of the first embodiment shown in FIG. 1. Here, the same configuration will not be described in detail, and the differences will be mainly described. The second embodiment differs from the first embodiment in the anti-entrapping function and the anti-drawing function.

In the second embodiment, the control circuit 21 functions as an open-close controller, a change detection unit, and an object detection unit. The control circuit 21 functions to detect entrapment between the window glass WG and a frame of the vehicle door D. More specifically, when closing (lifting) the window glass WG, the control circuit 21 compares the speed change amount ω of the motor 11, which is calculated based on the rotation detection signal, with an entrapment determination threshold value n. When the speed change amount ω is greater than or equal to the entrapment determination threshold value n, the control circuit 21 determines that an object was entrapped by the window glass WG. Based on the entrapment determination, the control circuit 21 inversely operates the window glass WG by a predetermined amount in the opening direction to release the entrapped object.

The control circuit 21 also functions to detect a drawn-in object, that is, an object being drawn in the vehicle door D when opening (lowering) window glass WG. More specifically, when opening the window glass WG, the control circuit 21 compares the speed change amount ω of the motor 11, which is calculated based on the rotation detection signal, with a drawing determination threshold value m. When the speed change amount ω is greater than or equal to the drawing determination threshold value m, the control circuit 21 determines that the window glass WG has drawn in an object and deactivates the motor 11 to stop the window glass WG from opening based on the drawing determination.

Figure 7:
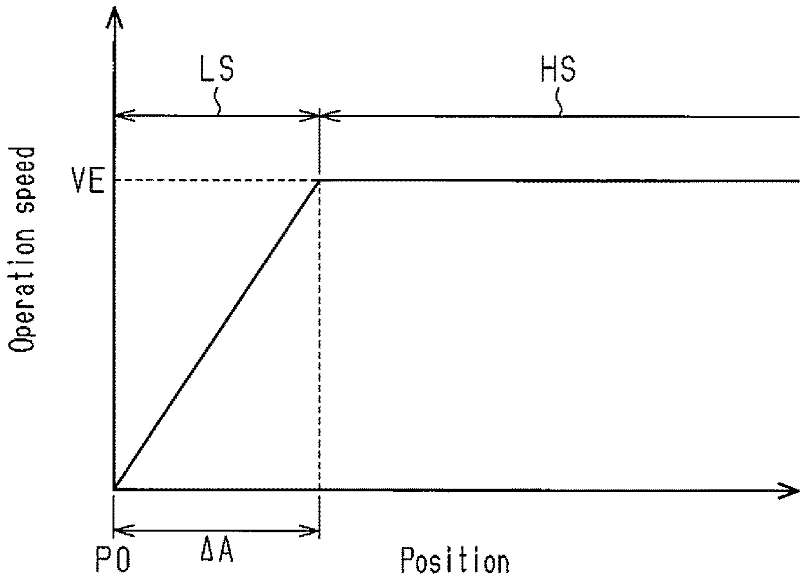
FIG. 7 is a graph showing the speed control of a second embodiment of a power window device according to the invention.

The control circuit 21 duty-controls (PWM-controls) the speed of the motor 11 to control the speed of the window glass WG. As shown in FIG. 7, the control circuit 21 performs slow-start control that operates the window glass WG at a low speed in a predetermined zone (low speed zone LS) immediately after the window glass WG starts to open or close. More specifically, when starting to operate, the window glass WG shifts from the low speed zone LS to a normal speed zone HS.

In the normal speed zone HS, the control circuit 21 supplies a constant power having the duty ratio of a fixed value (e.g., 100) to the motor 11. This operates the window glass WG at a normal speed VE. In the low speed zone LS, in which the amount the window glass WG moves from an operation start position P0 reaches a predetermined value ΔA, the control circuit 21 supplies power having a lower duty than the fixed value to the motor 11. This operates the window glass WG at a lower speed than the normal speed VE. In the present embodiment, the operation speed of the window glass WG is controlled to increase relative to the movement of the window glass WG, for example, in a linear manner, in the low speed zone LS and substantially reach the normal speed VE immediately before shifting to the normal speed zone HS. Preferably, the range (predetermined value ΔA) of the low speed zone LS is set to the count of the pulse edges in the rotation detection signal corresponding to the actual movement amount of the window glass WG of 20 mm to 30 mm. In the present embodiment, the closing operation and the opening operation have the same range of the low speed zone LS.

When closing the window glass WG in the normal speed zone HS (i.e., the movement amount of the window glass WG from the operation start position P0 being greater than or equal to the predetermined value ΔA), the control circuit 21 sets the entrapment determination threshold value n to a normal speed threshold value nH. When the window glass WG is closing in the low speed zone LS (i.e., the movement amount of the window glass WG from the operation start position P0 being less than the predetermined value ΔA), the control circuit 21 sets the entrapment determination threshold value n to a low speed threshold value nL, which is smaller than the normal speed threshold value nH.

In the same manner, when opening the window glass WG in the normal speed zone HS (i.e., the movement amount of the window glass WG from the operation start position P0 being greater than or equal to the predetermined value ΔA), the control circuit 21 sets the drawing determination threshold value m to a normal speed threshold value mH. When opening the window glass WG in the low speed zone LS (i.e., the movement amount of the window glass WG from the operation start position P0 being less than the predetermined value ΔA), the control circuit 21 sets the drawing determination threshold value m to a low speed threshold value mL, which is smaller than the normal speed threshold value mH.

The object detection control of the second embodiment and the effect will now be described with reference to FIG. 8. When opening and closing the window glass WG, only the rotation direction of the motor 11 differs and the control is substantially the same. The following description will focus on the opening of the window glass WG with reference to FIG. 8. The closing of the window glass WG will not be described in detail.

The control circuit 21 supplies power to the motor 11 through the drive circuit 22 based on operation of the operation switch 24 to open the window glass WG (step S1). The control circuit 21 calculates the speed change amount ω of the motor 11 based on the rotation detection signal output from the rotation detection sensor 13 (step S2).

In step S3, the control circuit 21 determines whether or not the movement amount of the window glass WG from the operation start position P0 is less than the predetermined value ΔA, that is, whether or not the window glass WG is operated in the low speed zone LS.

When the window glass WG is operated in the low speed zone LS, the control circuit 21 sets the drawing determination threshold value m to the low speed threshold value mL (step S4). Otherwise, when the window glass WG is not operated in the low speed zone LS (i.e., when the window glass WG is operated in the normal speed zone HS), the control circuit 21 sets the drawing determination threshold value m to the normal speed threshold value mH (step S5).

In step S6, the control circuit 21 performs the drawn-in object determination when opening the window glass WG. More specifically, the control circuit 21 compares the speed change amount ω of the motor 11 with the drawing determination threshold value m, which is set to the low speed threshold value mL or the normal speed threshold value mH. When the speed change amount ω is greater than or equal to the drawing determination threshold value m, the control circuit 21 determines that the window glass WG has drawn in an object. Based on the drawing determination, the control circuit 21 deactivates the motor 11 to stop the window glass WG from opening. When the speed change amount ω is less than the drawing determination threshold value m, the control circuit 21 determines that the window glass WG has not drawn in an object and returns to step S2.

Figure 8:
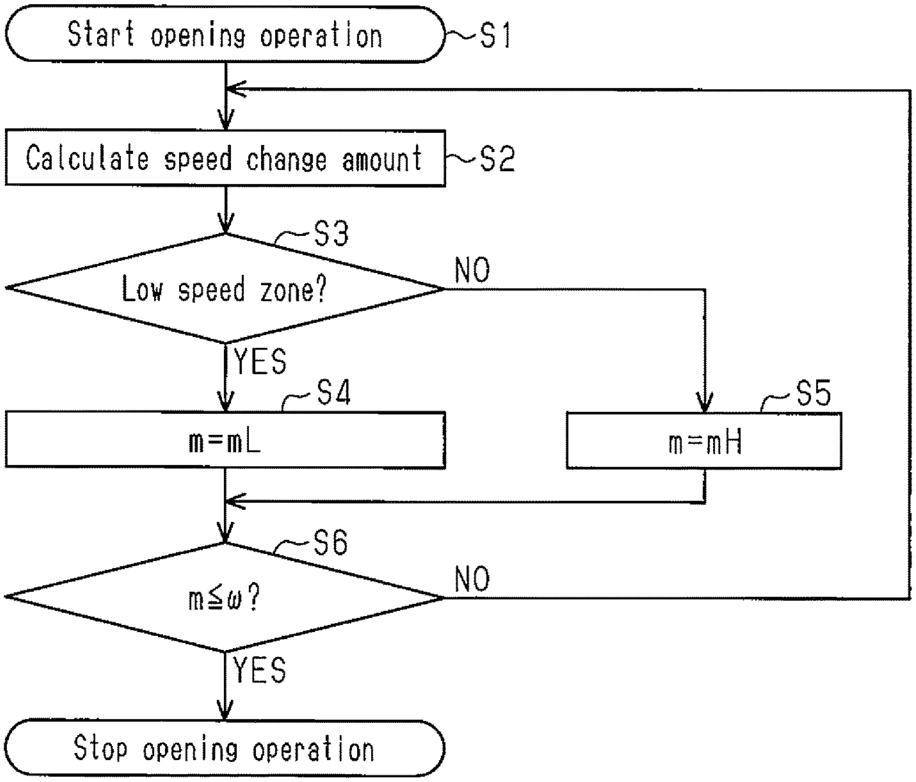
FIG. 8 is a flowchart showing the control of the power window device shown in FIG. 7.

The control executed when closing the window glass WG is substantially the same as that executed when opening the window glass WG except that in steps S4, S5, S6 shown in FIG. 8, the threshold values for the drawing determination (drawing determination threshold value m, low speed threshold value mL, and normal speed threshold value mH) are replaced with the threshold values for the entrapment determination (entrapment determination threshold value n, low speed threshold value nL, and normal speed threshold value nH).

The second embodiment has the advantages described below.

(3) In the low speed zone LS, the control circuit 21 sets the drawing determination threshold value m to the low speed threshold value mL, which is smaller than the normal speed threshold value mH, and the entrapment determination threshold value n to the low speed threshold value nL, which is smaller than the normal speed threshold value nH. That is, the control circuit 21 sets the determination threshold values (low speed threshold values mL, nL) for the low speed zone LS to values smaller than the determination threshold values (normal speed threshold values mH, mL) for the normal speed zone HS. This shortens time to determine an object detection in the low speed zone LS compared to when the drawing determination threshold value m and the entrapment determination threshold value n are constant regardless of the low speed zone LS and the normal speed zone HS. Thus, the object detection function may be improved.

(4) The low speed zone LS is set to the predetermined zone from the operation start position P0 of the window glass WG. Thus, the window glass WG starts to open and close at a low speed. This reduces the operation sound that may be generated in the entire window regulator including the motor 11 during opening and closing operations. Additionally, since the window glass WG starts to open and close at a low speed, the subtle position adjustment of the window glass WG may be easy.

The second embodiment may be modified as follows.

In the second embodiment, the control circuit 21 detects objects, that is, performs the entrapment detection and the drawing detection, based on the speed change amount ω of the motor 11. Instead, objects may be detected based on characteristic values other than the speed change amount co of the motor 11 (e.g., characteristic values corresponding to changes in the operation state of the window glass WG).

In the second embodiment, in the low speed zone LS, the control circuit 21 performs a speed increase control that increases the operation speed of the window glass WG by increasing the duty ratio in accordance with the movement of the window glass WG. Instead, in the low speed zone LS, the control circuit 21 may control the speed at a constant speed that is lower than the normal speed VE by setting a fixed duty ratio.

In the second embodiment, the opening operation and the closing operation have the same range of the low speed zone LS (predetermined value ΔA). Instead, the opening operation and the closing operation may have different ranges.

In the second embodiment, the low speed zone LS is set to the predetermined zone from the operation start position P0 of the window glass WG. Instead, the low speed zone may be set, for example, to a predetermined zone from a mechanical terminal position (fully closed position or fully open position) of the window glass WG. In this case, speed control (slow stop control) is performed on the low speed zone so that the speed of the window glass WG is gradually decreased from the normal speed VE. This configuration limits sounds that are generated when the window glass WG reaches the terminal position.

In the second embodiment, the control circuit 21 inversely operates the window glass WG by the predetermined amount in the opening direction based on the entrapment determination. Instead, the motor 11 may be deactivated based on the entrapment determination.

In the second embodiment, the control circuit 21 deactivates the motor 11 to stop the window glass WG from opening based on the drawing determination. Instead, the window glass WG may be inversely operated by a predetermined amount in the closing direction based on the drawing determination.

In the second embodiment, in the entrapment determination and the drawing determination, the determination threshold values (low speed threshold values mL, nL) for the low speed zone LS are set smaller than the determination threshold values (normal speed threshold values mH, nH) for the normal speed zone HS. Instead, in one of the entrapment determination and the drawing determination, the determination threshold value for the low speed zone LS may be set smaller than the determination threshold value for the normal speed zone HS.

In the second embodiment, the rotation speed of the motor 11 is duty-controlled. However, the rotation speed of the motor 11 may be regulated through a means other than duty control.

In the second embodiment, the invention is applied to the power window device 10, which functions to detect an entrapped object and a drawn-in object. Instead, the invention may be applied to a power window device that functions to detect one of an entrapped object and a drawn-in object.

In the second embodiment, the invention is applied to the power window device 10, which includes the X-arm type window regulator. Instead, the invention may be applied to a power window device that includes a wire-type window regulator.

In the second embodiment, the invention is applied to the power window device 10, which opens and closes the window glass WG included in the vehicle door D. Additionally, the invention may be applied to, for example, a sunroof device that opens and closes a roof glass included in a vehicle roof.

Technical concepts that can be acknowledged from the second embodiment and the modified examples of the second embodiment are as follows.

(B) The object detection unit functions as a drawing detection unit, the drawing detection unit is configured to compare a drawing determination threshold value with a characteristic value corresponding to a change in an opening state of the vehicle window, and when the characteristic value is greater than or equal to the drawing determination threshold value, the drawing detection unit is configured to determine that the vehicle window has drawn in an object when opening.

When this configuration is applied to a power window device provided with the drawn-in object detection function, the time used to determine a drawn-in object may be shortened in the low speed zone.

(C) The object detection unit functions as an entrapment detection unit, the entrapment detection unit is configured to compare an entrapment determination threshold value with a characteristic value corresponding to a change in a closing state of the vehicle window, and when the characteristic value is greater than or equal to the entrapment determination threshold value, the entrapment detection unit is configured to determine that the vehicle window has entrapped an object when closing.

When this configuration is applied to a power window device having the object entrapment detection function, the time to determine the entrapment may be shortened in the low speed zone.

(D) The low speed zone is set to a predetermined zone before the vehicle window reaches a terminal position.

This configuration limits sounds that occur when the vehicle window reaches the terminal position.

A third embodiment of a vehicle window opening device will now be described. The third embodiment of the power window device 10 has the same configuration as the power window device 10 of the first embodiment shown in FIG. 1. Here, the same configuration will not be described in detail, and the differences will be mainly described. The third embodiment differs from the first embodiment in the anti-drawing function.

Figure 9:
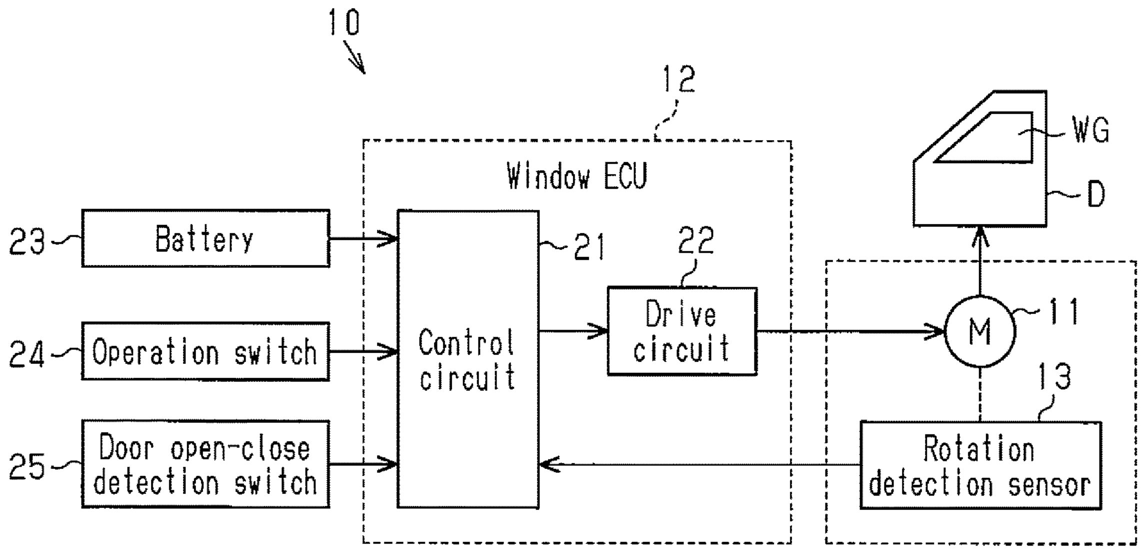
FIG. 9 is a schematic block diagram showing the electrical configuration of a third embodiment of a power window device according to the invention.

As shown in FIG. 9, the power window device 10 of the third embodiment includes a door open-close detection switch 25 (courtesy switch), which detects the opening and closing of the vehicle door D. The door open-close detection switch 25 inputs a signal to the control circuit 21. The door open-close detection switch 25 provides the control circuit 21 with a door open signal when the vehicle door D is open and a door close signal when the vehicle door D is closed. The control circuit 21 of the third embodiment functions as an open-close controller, a drawing determination unit, and a restriction unit.

The control executed by the power window device 10 of the third embodiment and the effect will now be described.

Figure 10:
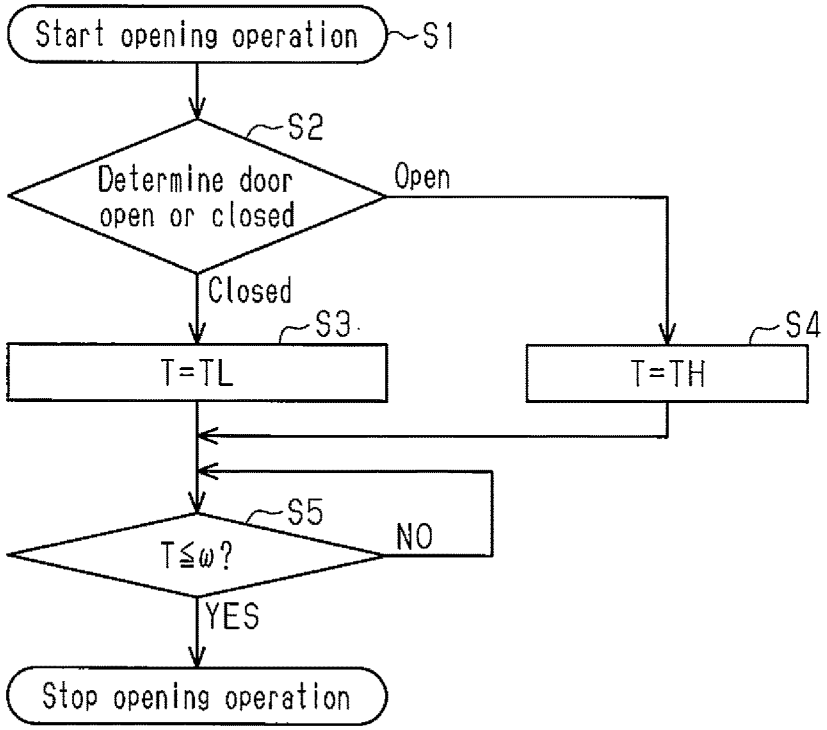
FIG. 10 is a flowchart showing the control of the power window device shown in FIG. 9.

As shown in FIG. 10, the control circuit 21 supplies power to the motor 11 through the drive circuit 22 to open the window glass WG based on the opening operation of the operation switch 24 (step S1).

In step S2, the control circuit 21 determines whether the vehicle door D is open or closed based on a signal received from the door open-close detection switch 25. When receiving the door close signal from the door open-close detection switch 25, the control circuit 21 determines that the vehicle door D is closed and sets a drawing determination threshold value T to a normal value TL (step S3). When receiving the door open signal from the door open-close detection switch 25, the control circuit 21 determines that the vehicle door D is open and sets the drawing determination threshold value T to a door open value TH that is greater than the normal value TL (step S4).

After the drawing determination threshold value T is set in step S3 or step S4, the control circuit 21 performs the drawing determination in step S5. In step S5, the control circuit 21 compares the speed change amount ω of the motor 11 with the drawing determination threshold value T. When the speed change amount ω is greater than or equal to the drawing determination threshold value T, the control circuit 21 determines that the window glass WG has drawn in an object. Based on the drawing determination, the control circuit 21 deactivates the motor 11 to stop the window glass WG from opening. When the speed change amount ω is less than the drawing determination threshold value T, the control circuit 21 determines that the window glass WG has not drawn in an object and repeats step S5.

Figure 11:
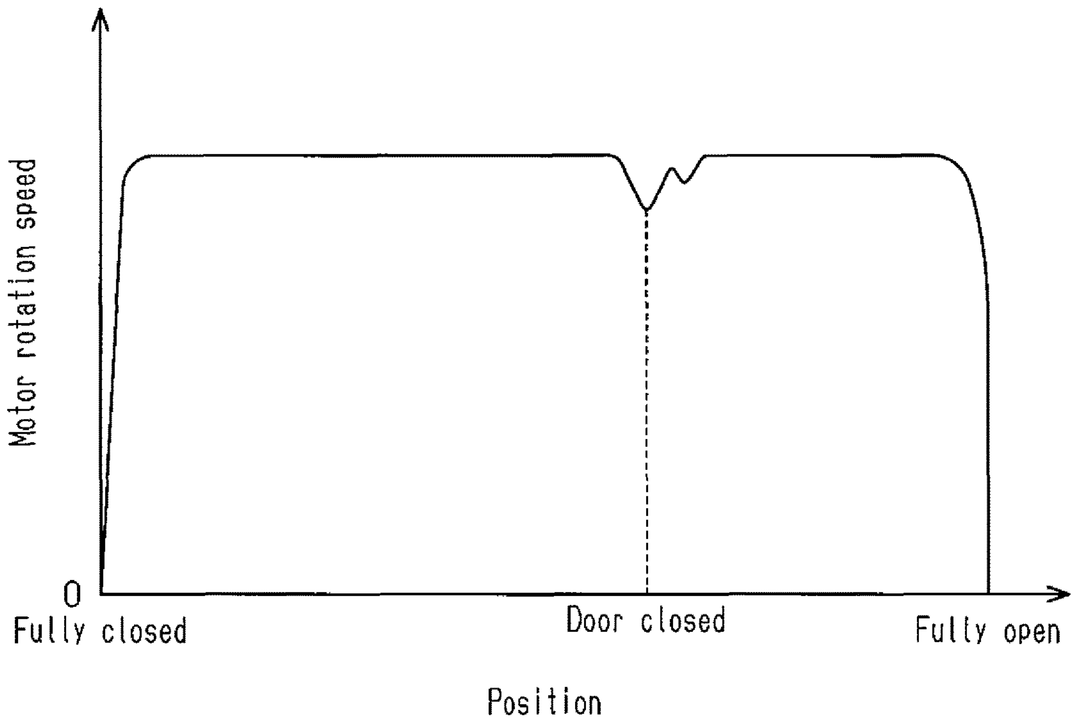
FIG. 11 is a graph showing changes in the rotation speed of the motor in the power window device shown in FIG. 9 when closing a vehicle door during the opening of the vehicle window.

As described above, when determined that the vehicle door D is open, the drawing determination threshold value T is set to the door open value TH, and the drawing determination is performed using the value TH. FIG. 11 shows changes in the rotation speed of the motor 11 when the vehicle door D is open and the opening operation of the operation switch 24 is performed to open the window glass WG from the fully closed position to the fully open position. As shown in FIG. 11, when closing the vehicle door D during the opening of the window glass WG, the impact produced by the closed vehicle door D causes the rotation speed of the motor 11 to temporarily drop. More specifically, the speed change amount ω of the motor 11 increases. In this case, the drawing determination threshold value T is set to the door open value TH. The door open value TH is set greater than the normal value TL so that drawing will not be detected when the impact produced by the closed vehicle door D increases the speed change amount ω of the motor 11. This limits erroneous detections of a drawn-in object that may be caused by the impact of the vehicle door D when closed.

The third embodiment has the advantages described below.

(5) The control circuit 21 sets the drawing determination threshold value T based on the open-close state of the vehicle door D. Thus, the drawing determination threshold value T is set in correspondence with the open-close state of the vehicle door D. This appropriately sets the drawing determination threshold value T when the vehicle door D is open. Consequently, erroneous detections of a drawn-in object may be limited when closing the vehicle door D during the opening of the window glass WG. Therefore, when closing the vehicle door D during the opening of the window glass WG, erroneous operations may be limited in which the anti-drawing control (deactivation of motor 11) is executed when no object is drawn in.

(6) When the vehicle door D is closed, the control circuit 21 sets the drawing determination threshold value T to the normal value TL (first value). When the vehicle door D is open, the control circuit 21 sets the drawing determination threshold value T to the door open value TH (second value), which is greater than the normal value TL. In this configuration, the drawing determination threshold value T is set to the normal value TL when the vehicle door D is closed. Additionally, when the vehicle door D is open, the drawing determination threshold value T is set to an appropriate value (value greater than normal value TL) that does not allow the drawing determination when the impact produced by the closed vehicle door D greatly changes the speed change amount ω of the motor 11. This appropriately limits erroneous detections of a drawn-in object that may occur when closing the vehicle door D during the opening of the window glass WG.

The third embodiment may be modified as follows.

In the third embodiment, after opening the window glass WG (after step S1), the control circuit 21 determines whether the vehicle door D is open or closed (step S2). Instead, after whether the vehicle door D is open or closed is determined based on the opening operation of the operation switch 24, the control circuit 21 may control the window glass WG to open.

In the third embodiment, the control circuit 21 sets the drawing determination threshold value T to one of the normal value TL and the door open value TH in accordance with the open-close state of the vehicle door D when the window glass WG starts to open. During the opening of the window glass WG, the drawing is determined based on the drawing determination threshold value T that was set when starting the opening operation regardless of the current open-close state of the vehicle door D during the opening of the window glass WG. Instead, the control circuit 21 may switch the drawing determination threshold value T between the normal value TL and the door open value TH based on the current open-close state of the vehicle door D during the opening of the window glass WG. Alternatively, when the vehicle door D is opened during the opening of the window glass WG, the control circuit 21 may change the drawing determination threshold value T from the normal value TL to the door open value TH. In this case, the control circuit 21 fixes the drawing determination threshold value T to the door open value TH during the opening of the window glass WG regardless of the open-close state of the vehicle door D.

Figure 12:
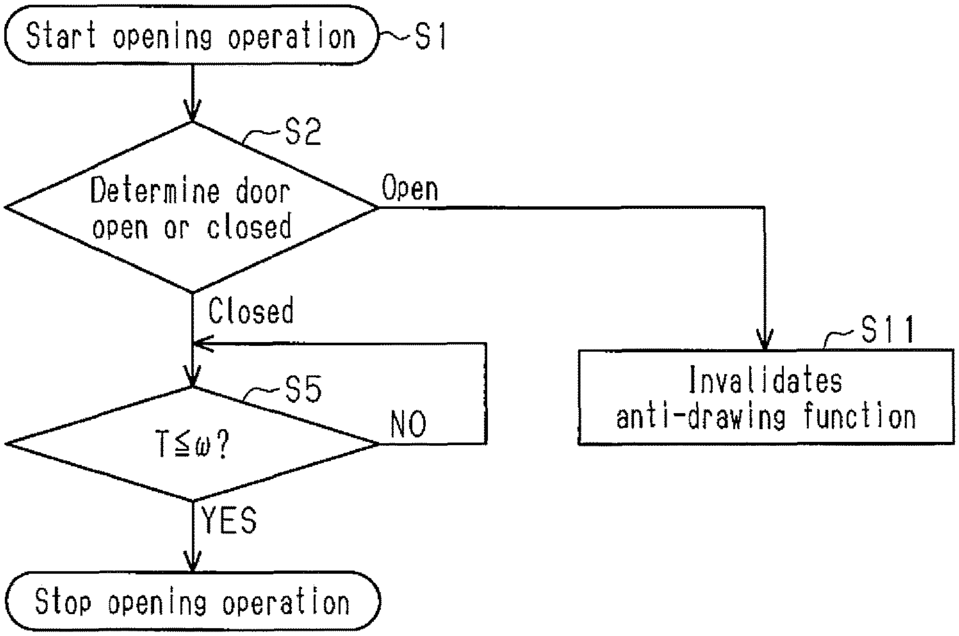
FIG. 12 is a flowchart showing the control of a modified example of the power window device of the third embodiment.

In the third embodiment, when the vehicle door D is open, the control circuit 21 sets the drawing determination threshold value T to the door open value TH, which is greater than the normal value TL. Additionally, the control circuit 21 may execute control such as that shown in FIG. 12. In the flowchart shown in FIG. 12, when determining that the vehicle door D is open in step S2, the control circuit 21 invalidates the anti-drawing function during the current opening operation (step S11). More specifically, in this case, even when the speed change amount ω of the motor 11 reaches or exceeds the drawing determination threshold value T during the opening operation, the control circuit 21 does not deactivate the motor 11, that is, does not execute the anti-drawing control. When determining that the vehicle door D is closed in step S2, the control circuit 21 performs the drawing determination based on the drawing determination threshold value T (normal value TL).

In this configuration, when the vehicle door D is closed, the control circuit 21 performs the drawing determination. When the vehicle door D is open, the control circuit 21 performs a restriction so that the anti-drawing control is not executed even when the speed change amount ω of the motor 11 reaches or exceeds the drawing determination threshold value T. Thus, when the vehicle door D is closed during the opening of the window glass WG, the anti-drawing control is not executed even if the speed change amount ω of the motor 11 greatly changes. This limits erroneous operations that may occur when closing the vehicle door D.

In the third embodiment, the control circuit 21 detects a drawn-in object based on the speed change amount ω of the motor 11. Instead, a drawn-in object may be detected based on characteristic values other than the speed change amount ω of the motor 11 (characteristic values of the motor 11 that vary in accordance with changes in load applied to the window glass WG).

In the third embodiment, the control circuit 21 deactivates the motor 11 to stop the window glass WG from opening based on the drawing determination. Additionally, for example, the control circuit 21 may inversely operate the window glass WG by a predetermined amount in the closing direction based on the drawing determination.

In the third embodiment, the invention is applied to the power window device 10, which includes the X-arm type window regulator. Instead, the invention may be applied to a power window device including a window regulator of a wire-type, a single-arm type, or the like.

In the third embodiment, the invention is applied to the power window device 10, which opens and closes the window glass WG included in the vehicle door D. Additionally, the invention may be applied to a sunroof device that opens and closes a roof glass included in a vehicle roof.

Technical concepts that can be acknowledged from the third embodiment and the modified examples of the third embodiment are as follows.

(E) If the vehicle door is closed when the vehicle window starts opening, the drawing determination unit is configured to set the threshold value for determining that the vehicle window is open to a first value, and if the vehicle door is open when the vehicle window starts closing, the drawing determination unit is configured to set the threshold value for determining that the vehicle window is open to a second value that is greater than the first value.

In this configuration, the drawing determination unit sets the determination threshold value to the normal value if the vehicle door is closed when the vehicle window starts to open. Additionally, the drawing determination unit sets the determination threshold value to an appropriate value if the vehicle door is open when the vehicle window starts to open. The appropriate value is greater than the normal value so that the drawing will not be detected even when an impact of the vehicle door when closed greatly changes the characteristic value of the motor. Thus, erroneous detections of a drawn-in object may be limited when closing the vehicle door during the opening of the vehicle window.

(F) If the vehicle door is open when the vehicle window starts to open, the restriction unit is configured to perform the restriction even when a characteristic value of the motor is greater than or equal to the determination threshold value as the vehicle window opens.

In this configuration, during the opening of the vehicle window, the anti-drawing control (deactivation or inverse operation by predetermined amount) is not executed even when the characteristic value of the motor greatly changes when closing the vehicle door. This limits erroneous operations that would occur when closing the vehicle door.

The present examples and embodiments are to be considered as illustrative and not restrictive, and the invention is not to be limited to the details given herein, but may be modified within the scope and equivalence of the appended claims.

The invention claimed is:

1. A vehicle window opening device comprising:

an open-close controller configured to control opening and closing of a vehicle window that is driven by a motor;

a drawing determination unit;

a restriction unit; and an initial mask zone setting unit configured to set a predetermined zone from a position where the vehicle window starts to open as an initial mask zone, wherein the drawing determination unit is configured to determine that the vehicle window has drawn in an object when a characteristic value of the motor is greater than or equal to a determination threshold value, the characteristic value of the motor changes in accordance with a change in a load applied to the vehicle window when the vehicle window opens, the open-close controller is configured to execute anti-drawing control that stops opening the vehicle window or reverses the vehicle window by a predetermined amount based on the drawing determination of the drawing determination unit, the restriction unit is configured to restrict the open-close controller from executing the anti-drawing control when the vehicle window is located in the initial mask zone even if the characteristic of the motor is greater than or equal to the determination threshold value, when the position where the vehicle window starts to open is located outside a fully closed region including a fully closed position, the initial mask zone setting unit is configured to set the initial mask zone to a normal value, and when the position where the vehicle window starts to open is located in the fully closed region, the initial mask zone setting unit is configured to set the initial mask zone to a fully closed region value that is greater than the normal value.

2. The vehicle window opening device according to claim 1, wherein the fully closed region is set in accordance with a depth of the vehicle window inserted into a weather strip arranged on a window frame.

3. The vehicle window opening device according to claim 1, wherein the initial mask zone setting unit is configured to set the fully closed region value based on a position of the vehicle window in the hilly closed region.

4. The vehicle window opening device according to claim 1, wherein the initial mask zone setting unit is configured to set the fully closed region value based on a value of voltage applied to the motor when closing the vehicle window.

5. A vehicle window opening device comprising:

an open-close controller configured to control opening and closing of a vehicle window that is driven by a motor;

a drawing determination unit; and a determination threshold value setting unit, wherein the drawing determination unit is configured to determine that the vehicle window has drawn in an object when a characteristic value of the motor is greater than or equal to a determination threshold value, the characteristic value of the motor changes in accordance with a change in a load applied to the vehicle window when the vehicle window opens, the open-close controller is configured to execute anti-drawing control that stops opening the vehicle window or reverses the vehicle window by a predetermined amount based on the drawing determination of the drawing determination unit, when a position where the vehicle window starts to open is located outside a fully closed region including a fully closed position, the determination threshold value setting unit is configured to set the determination threshold value to a normal value, and when the position where the vehicle window starts to open is located in the fully closed region, the determination threshold value setting unit is configured to set the determination threshold value to a fully closed region value that is greater than the normal value.

* * * * *